United States Patent [19] [11] 3,745,523
Lewis et al. [45] July 10, 1973

[54] DIAGNOSTIC SYSTEM FOR INFLATABLE SAFETY BAG FIRING CIRCUIT

[75] Inventors: Donald J. Lewis, Troy, Mich.;
William Gordon, Knoxville, Tenn.;
Robert W. Wulbrecht, Utica, Mich.

[73] Assignee: Allied Chemical Corporation, New York, N.Y.

[22] Filed: Oct. 20, 1971

[21] Appl. No.: 190,861

[52] U.S. Cl. .............................. 340/52 R, 340/52 H
[51] Int. Cl. ............................................. B60r 21/00
[58] Field of Search ................. 340/52 R, 52 H, 53, 340/61, 380; 200/61.45; 180/91, 103, 104

[56] References Cited
UNITED STATES PATENTS

| | | | |
|---|---|---|---|
| 3,633,159 | 1/1972 | Dillman | 340/52 H |
| 2,198,443 | 4/1940 | Paul et al. | 340/380 UX |
| 3,668,627 | 6/1972 | Brainerd | 180/103 X |
| 3,622,974 | 11/1971 | Best | 340/52 H |
| 3,272,174 | 9/1966 | Pribonic | 340/380 X |

Primary Examiner—Alvin H. Waring
Attorney—Jonathan Plaut et al.

[57] ABSTRACT

A circuit for firing the gas generating system of an inflatable safety bag device includes a capacitor which is charged from the battery at such time as the ignition switch is closed. A light emitter is connected to the capacitor so as to be energized during the charging of the capacitor. A sensor detects output from this light and controls the energization of a second light emitter. In the event the first light emitter emits light following the closure of the ignition switch, indicating proper operation of the circuitry, the second light emitter will be deenergized. Fiber optic bundles lead from both of the light emitters to a visual indicator assembly mounted on the dashboard of the vehicle. An alternate embodiment of the invention employs only a single light emitter diode which is normally energized and is deenergized in the event an inductive sensing means does not detect the proper operation of the charging circuitry.

7 Claims, 3 Drawing Figures

INVENTORS.
DONALD J. LEWIS
WILLIAM GORDON
ROBERT W. WULBRECHT

BY:

ATTORNEY.

DIAGNOSTIC SYSTEM FOR INFLATABLE SAFETY BAG FIRING CIRCUIT

BACKGROUND OF THE INVENTION

1. Field of the Invention

This invention relates to apparatus for detecting the condition of readiness of a firing circuit for a gas inflatable automotive safety device and signalling the driver of its findings.

2. Description of the Prior Art

One of the most promising form of system for protecting the driver of an automotive vehicle against the hazards of collisions involves bags which are inflated in a fraction of a second upon the detection of the collision so as to extend between the driver and the vehicle to restrain the driver in his seat and cushion his forward motion. The bags used with such systems are inflated by the release of compressed gas stored in a container, by the generation of gas by so-called "pyrotechnic" apparatus, or by some combination of these two techniques.

One of the problems encountered in the design of such systems is the unusual burden placed on that portion of the equipment which initiates the release and/or generation of gas upon the detection of a collision condition; hereinafter referred to as the "firing circuit". This circuit must operate with an unusually high degree of reliability to initiate the gas generation and release process when the collision is detected. In the event of failure of the circuit to initiate firing upon the occurrence of a collision the system will be useless and the operator will be subjected to the high forces associated with the impact. In the event of false operation of the circuitry when no impact is detected the sudden inflation of the bags when not required is undesirable. In addition to these problems there is no way of testing the firing circuit after it has been placed in association with the gas generating apparatus in the vehicle. Additionally, the firing circuit may be called upon to operate properly after having lain dormant in the vehicle for a number of years during which the vehicle has been used without being involved in a collision.

All of these problems have led to the invention of a diagnostic device which checks the proper operation, and readiness for use of substantial sections of the firing circuitry during normal operation of the vehicle. As disclosed in United States Patent Application, Ser. No. 177,559, filed 9/2/71 entitled "Diagnostic Firing Circuit", assigned to the assignee of the present invention, such circuitry preferably includes a signal lamp connected to the firing circuitry so as to be normally energized for a brief period of time during the normal operation of the vehicle, as when the ignition switch is closed. A sensor electrically isolated from the energizing circuitry for the first lamp, so as not to be subject to its failures, is adapted to monitor the proper operation of the first signal lamp and to control a second signal lamp so that the second lamp is energized at such time as the first lamp should normally have been energized but failed to light. In normal operation of this diagnostic system the first lamp will thus be lit for a few seconds upon closure of the ignition switch and the second signal light will not be energized. If that portion of the firing circuitry which is monitored by the first signal lamp is defective in some way, the first signal lamp will fail to light and thereupon the second signal light will be energized and stay lit until the ignition switch is opened. The signal lights are disposed in the dashboard of the vehicle so as to be readily visible to the driver to warn of the improper condition of the firing circuitry.

One of the problems associated with the implimentation of this diagnostic signal device arises from the need to monitor the operation of the first signal lamp in a manner independent of the first signal lamp circuitry, so that failure of that circuitry will not adversely affect the operation of the second signal lamp. This monitoring may be readily accomplished by a photo-detector positioned so as to be sensitive to the light emission of the first signal device, or by some other sensor positioned to detect the energy, electrical, thermal, and magnetic generation associated with the proper operation of the first signal device. However, if the first signal device is positioned on the dashboard of the vehicle so as to be visible to the driver, a mechanism must be provided to isolate the sensor from stray optical or thermal emissions not associated with the first signal. Most important, however, is the possibility of the induction of electro-magnetic energy into the lamp circuit thence into the firing circuit.

SUMMARY OF THE INVENTION

In order to obviate this difficulty, the present invention contemplates a system wherein the first lamp is not supported in the vicinity of the vehicle dashboard but is rather positioned with the balance of the firing circuit at a location normally hidden to the vehicle driver. At this location the sensor can easily be isolated from stray optical, thermal, and electrical, etc. signals so that it is solely sensitive to the proper operation of the first signal device. The optical signals from the lamps are then conveyed to the driver through a fiber optics bundle which extends between the signal lamps and a visual signal device supported in the vicinity of the vehicle dashboard. The fiber optics light conductor can only fail if it is physically broken which will probably only occur during a collision situation. Removing the lamp from the dashboard area to a normally inaccessible area increases its life expectancy by virtue of removing it from those forces which come to play in the area of the dashboard.

In the first embodiment of this system, both the first and second signal lamps are disposed at a location remote from the dashboard and their light emission is conveyed to the dashboard through fiber optic bundles. In a second embodiment of the invention, the first signal light is eliminated and the proper condition of the firing circuit is detected by inductively sampling the current flow through the firing circuit after the closure of the ignition. This inductive detector controls the operation of a single signal lamp which is normally lit only during the charging cycle so as to reenergize that lamp in the event of an improper current flow during the testing. Failure of the signal lamp to light during the starting cycle will warn the operator of some defect, either in the firing or the diagnostic circuitry. This defect may be only the failure of the light emitting device itself, but informs the driver of the need for checking the circuitry.

Other objectives, advantages, and applications of the present invention will be made apparent by the following detailed description of two preferred embodiments of the invention. The description makes reference to the accompanying drawings, in which.

Figure 1:
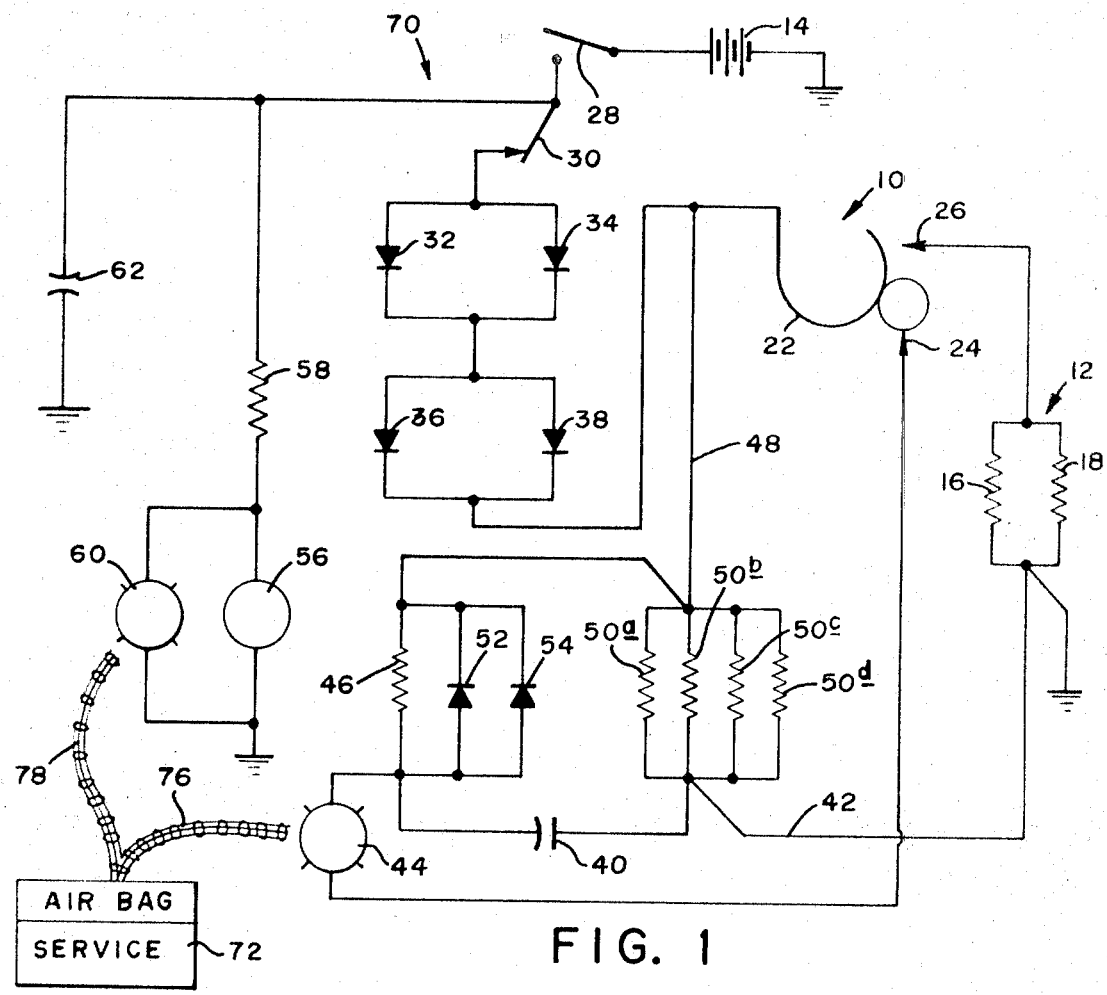
FIG. 1 is a schematic diagram of a firing system diagnostic circuit formed in accordance with a first preferred embodiment to the invention.

The sensor 10 is schematically illusated as having a roller 20 which rides on the outer side of a curved band 22. The band connects to the input terminal of the switch and the roller, which is conductive, rides between a normally closed terminal 24 and a normally open terminal 26. In the event of an impact of the type intended to inflate the bags, the roller 20 moves away from the contact 24 and into abutment with the contact 26 thereby disconnecting the contact 24 from the input terminal and connecting contact 26 to the input.

The battery 14 has its negative terminal connected to ground and its positive terminal connected to an ignition switch 28. The other terminal of the ignition switch is connected to a low pressure sensor switch 30. The sensor switch 30 is of the type that is desclosed in United States Patent Application Ser. No. 139,492, filed May 3, 1971, entitled "Low Pressure Indicator for Air Bag Safety System". The switch is closed as long as the pressure in the associated gas tank is sufficiently high to inflate the bag in the event of a collision. If the pressure falls below this threshhold level, the switch 30 opens.

The input terminal 22 of the impact sensor switch 11 is connected to the battery, when the switches 28 and 30 are closed, through a set of diodes 32, 34, 36 and 38. The diodes 32 and 34 are connected in parallel to one another as are the diodes 36 and 38 and the two pairs are connected in series. Each of the diodes has the voltage rating and current capacity sufficient to carry the entire firing current and in a normal, non-redundant circuit, only a single diode would be provided to perform the function of these four elements.

This redundant arrangement insures proper operation of the system despite the failure of any one of the diodes. If any of the diodes becomes open circuited, its companion diode in the parallel set is operative to carry the current. If any of the diodes become short circuited, the other parallel pair provides unidirectional current limiting capability.

Thus, in normal operation of the circuit, with the ignition switch closed and the low pressure sensor switch 30 closed, if the vehicle were to become involved in a collision which would cause the ball 20 of the sensor switch 11 to move into contact with the terminal 26 of the full current of the battery would pass through the electro-explosive devices 12, which have one end grounded, through the diodes 32, 34, 36, 38 and the impact sensor 10.

A capacitor 40 is provided in the circuit to act as an alternate power source for the electro-explosive devices 12 in the event of failure of the battery 14 at the time of impact. The capacitor is large, having a rate of 12,000 microfarands in the preferred embodiment of the invention. One end of the capacitor 40 is connected to ground through a conductor 42. The other end of the capacitor connects to the positive terminal of the battery through a light emitter 44 which is connected to the noramlly closed contact 24 of the impact sensor switch 10. Thus, the capacitor 40 is charged to substantially the potential of the battery 14 when the ignition switch 28 and the low pressure sensor switch 30 are closed and the impact sensor switch 11 is in its normal condition.

A resistor 46 provides an alternate charging path for the capacitor 40 through a conductor 48 in the event that the light emitter 44 is burned out or is removed from its socket. The resistor 46 has a substantially higher resistance than the lamp so that when the lamp is in place the charging of the capacitor occurs substantially through the lamp. In the preferred embodiment the lamp may have a resistance of 180 ohms and the resistor 46 may have a value of 27,000 ohms.

When the capacitor 40 is disconnected from the battery it is discharged at a relatively low rate through the resistor 46 and a group of four parallel resistors 50a, 50b, 50c and 50d. These resistors 50 are in series with the resistor 46 across the capacitor. The four resistors have a relatively low resistance such as approximately 180 ohms each. Four are provided so that in the event of one of the resistors becoming open the path resistance will not be increased appreciably.

The capacitor 40 thus forms an alternate power source for activating the electro-explosive devices 12 at such time as the sensor switch 10 activates the circuit. In the event of an impact which disconnects the battery, as sometimes occurs because of the high inertia of the battery, the capacitor 40 will quickly discharge through the electro-explosive devices which have a resistance of about 4.50 ohms each. This discharge path includes a pair of diodes 52 and 54 which are disposed in parallel with one another to provide a firing path even if one of the units opens.

Because of the discharge of the capacitor 40 through the resistors 46 and 50 after the ignition switch 28 is opened, when the driver later restarts the vehicle the capacitor 40 will initially be in a discharged state. As soon as the ignition switch 28 is closed the capacitor begins to charge through the diodes 32, 34, 36 and 38, the sensor switch 10 and the light emitting diode 44. The potential difference which exists between the capacitor 40 and the battery during this charging period causes the light emitter 44 to light. The constants of the circuit are such that the charging normally takes about 5 seconds. After that time the capacitor will have substantially the same charge as the battery, and no current will flow through the light emitter 44.

The light emitter 44 is disposed, along with the balance of the firing circuit, at a position on the vehicle which is not immediately accessible and not observable to the driver of the vehicle. Accordingly, the driver cannot view the light. A light activated switch 56 is disposed with the balance of the firing circuitry in the driver-remote location and is physically positioned with respect to the light emitter 44 so as to receive light at such time as the lamp is energized. The light sensitive switch is a device which is normally nonconductive and becomes conductive when a proper direct current potential exists between its anode and cathode and it receives light.

In the preferred embodiment of the invention, the light sensitive switch 56 constitutes a switch having one end grounded and the other end connected to the ignition switch through current limiting resistor 58. Before the ignition switch 28 is closed the unit 56 is in its nonconductive condition. As the ignition switch is closed if the light emitter 44 lights, the unit 56 will go into its conductive state within a few milliseconds and will remain in that state until the ignition switch opens, despite the subsequent turnoff of the light emitter 44.

The switch 56 shunts a second light emitter 60 which is also disposed with the circuitry 10 at the position remote and not observable to the driver. When the unit 56 is in its conductive state it shorts out the light emitter 60 so that the lamp is not energized. In the normal operation of the circuit when the ignition switch 28 is closed, the light emitter 60 will only be energized for the few milliseconds required for the light emitter 44 to reach a sufficient illumination level to energize the unit 56 into its conductive state wherein it shorts out the light emitter 60. Thus, in normal operation of the vehicle the light emitter 60 will not be lit when the ignition switch is on. However, in the event of failure of the light emitter 44 to light upon closure of the ignition switch, for any number of reasons, the lamp 60 will remain burning as long as the ignition switch is closed.

The circuit is completed by a spark gap 62 which is disposed between the ignition switch and ground and acts as a voltage limiter for the entire system. In the event that a high voltage signal is somehow impressed between the battery and ground the gap 62 will limit the voltage provided to the firing circuit.

It will be noted that the schematic diagram is somewhat unusual in the interconnection of the elements. For example, the right-hand end of the capacitor 40 is illustrated in FIG. 1 as connected to ground through the connector 42 which also joins one end of the electro-explosive devices 12 and one end of the resistors 50a, 50b, 50c, and 50d to ground. This connection 42 represents the actual manner in which the circuit is wired and this is done to provide various diagnostic checks through the light emitting diodes 44 and 60. For example, if the ground wire for the electro-explosive device 12 becomes open, the capacitor 40 will not charge upon closure of the ignition switch and accordingly the light emitter 44 will not light and the light emitter 60 will remain lit signalling a malfunction to the driver.

If the device 12, the resistor 50 and the capacitor 40 were each independently grounded, the lamp would not operate to test all their grounds.

As has been previously noted, either an open or a short in the diodes 32, 34, 36 and 38 will be corrected by their redundancy. In a similar manner the only malfunction of the diodes 52 and 54 which could affect the system would be a short in one of the diodes and in that event the capacitor 40 would effectively be shorted and the light emitter 44 would not be lit by closure of the ignition switch. A short in the resistor 46 would produce the same effect. If the resistor 46 became opened the system would still operate properly as long as the light emitter 44 was not opened. It should be noJed that when the light emitter 44 is open, charging of the capacitor takes place through the resistor 46, and the light emitter 60 will remain lit but the system will still be in condition to inflate the bags in the event of an impact. If the capacitor 40 becomes open the light emitter 44 will not light upon the ignition switch closing and if the capacitor 44 becomes shorted the light emitter 44 will remain lit as long as the ignition switch is closed.

Since the light emitter 44 will not light if the low pressure switch 30 is open the system also provides a check for low pressure and eliminates the need for a separate low pressure indicator lamp which was previously considered as required for such systems.

Figure 2:
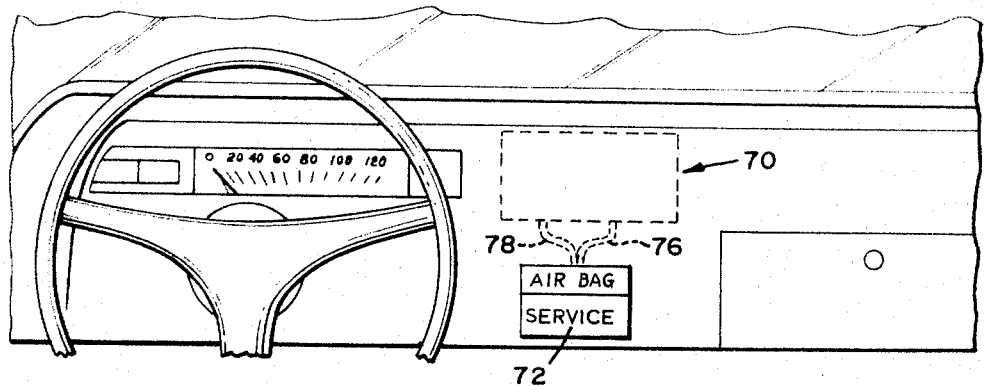
FIG. 2 is a perspective view of the dashboard area of a vehicle, with sections broken away, illustrating the physical position of the components illustrated schematically in FIG. 1.

All of the components thus far described are positioned in a single electronic assembly, generally indicated at 70 in FIG. 2, which is disposed at some convenient location in the vehicle not readily observable by the driver such as in an area behind the dashboard. Thus, the light emitters 44 and 60 are not normally visible to the driver. The driver is provided with information relative to the condition of the safety system by a signal 72 which is conveniently positioned on the dashboard of the vehicle, preferably in the region of the other vehicle instruments, so as to be readily observable by the driver. The indicator 72 simply consists of a translucent panel.

The light emitter 44 is connected to the rear of the indicator 72 through a light conductor 76, which preferably takes the form of a bundle of optically conductive fibers. Such fibers are well known in the art and are operative to provide illumination behind the indicator 72 at such time as the light emitter 44 is energized. Similarly, the light emitter 60 is connected to the rear of the indicator 72 through a similar bundle of optical fibers 78 so as to illuminate the sign at such time as the light emitter 60 is illuminated.

The driver may determine the condition of the light emitters 44 and 60 by observing the signal 72. In the normal operation of the vehicle the signal 72 will be lit for a few seconds required to charge the capacitor 40 after the ignition switch is closed indicating proper operation of the circuitry. In the event that the light emitter 44 fails to light after the ignition switch is closed, the light emitter 60 will remain on, providing a signal to the driver through the signal 44.

By reason of the positioning of the light emitters 44 and 60 in the remote location 70 where they are shielded from extraneous influences without any difficulty being encountered in physically positioning the light activated switch 56 with respect to the light emitter 44 so that it is only sensitive to radiation from the lamp.

Figure 3:
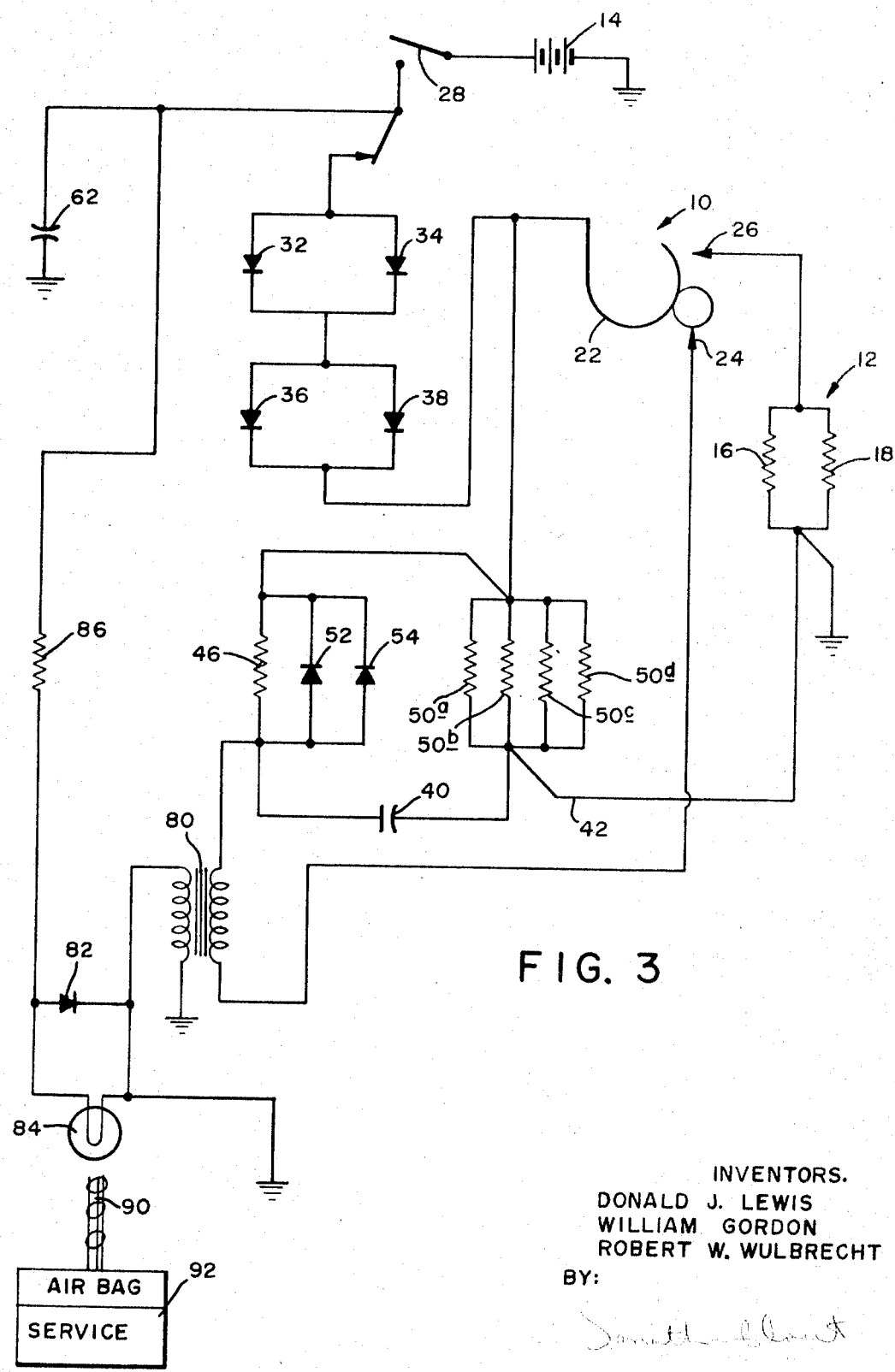
FIG. 3 is a partial schematic diagram of a firing system diagnostic circuit constituting a modification of the circuit of FIG. 1.

FIG. 3 illustrates an alternate embodiment of the invention wherein only a single signal lamp is employed. Much of the electrical circuitry, employed in this embodiment is identical to that employed in the circuitry of FIG. 1, and the same numerals are used for the element of both circuits. The system of FIG. 3 differs from the system of FIG. 1 in that the light emitter 44 of FIG. 1 is replaced by an iron core pulse transformer 80. The secondary of the transformer 80 has one end grounded and the other end coupled to the gate of a silicon controlled rectifier 82.

The anode-cathode circuit of the rectifier is disposed in series with a lamp 84 and a current limiting resistor 86 between the ignition switch 28 of the vehicle and ground. When the controlled rectifier is non-conductive the lamp is then energized by the current passing from the positive terminal of the battery to ground, when the controlled rectifier is in its conductive state the lamp 84 is not energized.

In the normal operation of the circuitry when the ignition switch is closed the initial current surge to the capacitor 40 causes a pulse to be induced in the secondary of the transformer 80. This pulse is applied to the gate of the controlled rectifier 82 and causes the rectifier to be conductive. Thereafter, until the ignition siwtch 28 is again opened, the lamp 84 will remain out. In the event of some improper operation of the diagnostic circuitry, which prevents the charging of the capacitor 40 upon closing of the ignition switch, no pulse will be provided to the gate of the controlled rectifier 82 and the controlled rectifier will remain in its non-conductive state, and the lamp 84 will be lit.

The circuitry thus far disclosed is positioned in an area inaccessible to the driver of the vehicle, in the same manner as the circuitry 70 of FIG. 2. The driver is made aware of the condition of lamp 84 by a fiber optics bundle 90 extending between the lamp 84 and a signal device 92 disposed on the dashboard of the vehicle in a prominent location. The operator will be informed of some defect in the diagnostic circuitry by the causing of the signal 92 to light.

By means of this single lamp circuit the driver will readily be advised of the condition of the circuitry.

Having thus described our invention, we claim:

1. Diagnostic circuitry, adapted for use in a gas inflatable safety bag system of a motor vehicle for signalling to the driver of the vehicle the condition of a firing circuit having a capacitor adapted to be charged from the vehicle's battery upon closure of the vehicle's ignition switch, comprising a light emitting device connected to said firing circuit and operable to be energized at such time as said capacitor is being charged from said battery; visual signal means disposed adjacent to the vehicle driver position and remote from said light emitting device; and light conductive means coupling said light emitting device to said visual signal means.

2. The diagnostic circuitry of claim 1 including a sensor physically disposed adjacent to said light emitting device and being operative to sense its state of opertion and a second light emitting device operative to be energized by the sensor in the event of failure of the aforesaid light emitting device to be energized.

3. In a vehicle having an inflatable safety system including a firing circuit for initiating the inflation of said system having a capacitor adapted to be charged from the vehicle's battery upon closure of the vehicle's ignition switch, diagnostic circuitry comprising a light emitting device operative to be energized during such time as said capacitor is being charged from said battery; a visual signal device disposed in said vehicle at a location remote from said light emitting device so as to be visible to the driver of the vehicle; and light conductive means extending between said light emitting device and said signal device operative to change the state of said signal device at such time as the light emitting device changes state.

4. The firing circuit of claim 3 including a sensor means disposed adjacent to and responsive to energization of said light emitting device, and a second light emitting device associated with said sensor means, said sensor means being operable to prevent energization of said second light emitting device upon energization of the aforesaid light emitting device.

5. Diagnostic means, adapted for use in a gas inflatable safety bag system of a motor vehicle for signalling to the driver of the vehicle the condition of firing circuitry having a capacitor adapted to be charged from the vehicle's battery upon closure of the vehicle's ignition switch, comprising a first light emitting device operative to be energized at such time as said capacitor is being charged from said battery; a sensor physically disposed adjacent to said first light emitting device and being operative to sense its state of operation; a second light emitting device operatively connected to said sensor so that the second light emitting device is operable to be energized in the event of failure of the first light emitting device to be energized; visual signal means disposed adjacent to the driver position and remote from said first light emitting device; and light conductive means coupling each of said light emitting devices to said visual signal means.

6. The diagnostic means of claim 5 wherein said light conductive means constitute a bundle of optically conductive fibers.

7. In a vehicle having an inflatable safety system including a firing circuit for initiating inflation of said system and a vehicle battery, an electric power storage device connected to the vehicle battery during the normal operation of the circuitry and disconnected therefrom at other times; means for discharging said power storage device; means for sensing the potential difference between said battery and said power storage device including a light emitting device; a signal device disposed adjacent to the vehicle driver position and remote from said first light emitting device; and light conductive means coupling said light emitting device and said visual signal means.

* * * * *